(12) United States Patent
Speldrich et al.

(10) Patent No.: US 9,952,079 B2
(45) Date of Patent: Apr. 24, 2018

(54) FLOW SENSOR

(71) Applicant: Honeywell International Inc., Morristown, NJ (US)

(72) Inventors: Jamie Speldrich, Freeport, IL (US); Richard C. Sorenson, Columbus, OH (US)

(73) Assignee: Honeywell International Inc., Morris Plains, NJ (US)

( * ) Notice: Subject to any disclaimer, the term of this patent is extended or adjusted under 35 U.S.C. 154(b) by 250 days.

(21) Appl. No.: 14/800,492

(22) Filed: Jul. 15, 2015

(65) Prior Publication Data

US 2017/0016752 A1   Jan. 19, 2017

(51) Int. Cl.
*G01F 5/00* (2006.01)
*G01F 1/684* (2006.01)

(52) U.S. Cl.
CPC ............ *G01F 5/005* (2013.01); *G01F 1/6842* (2013.01); *G01F 1/6845* (2013.01); *G01F 5/00* (2013.01)

(58) Field of Classification Search
CPC ...... G01F 5/005; G01F 1/6842; G01F 1/6845; G01F 5/00; G01F 1/00; G01N 11/06; E21B 47/10; E21B 47/00
USPC ........... 73/202, 861, 152.29, 152.18, 152.01, 73/54.07
See application file for complete search history.

(56) References Cited

U.S. PATENT DOCUMENTS

| | | | |
|---|---|---|---|
| 2,746,296 A | 5/1956 | Stover | |
| 3,433,069 A | 3/1963 | Trageser | |
| 3,216,249 A | 11/1965 | Joel | |
| 3,410,287 A | 11/1968 | Van Der Heyden et al. | |
| 3,559,482 A | 2/1971 | Baker et al. | |
| 3,640,277 A | 2/1972 | Adelberg | |

(Continued)

FOREIGN PATENT DOCUMENTS

| DE | 3905746 | 8/1990 |
|---|---|---|
| DE | 102004019521 | 11/2005 |

(Continued)

OTHER PUBLICATIONS

Europe Patent Application No. 16178737, Extended European Search Report and Written Opinion, dated Dec. 3, 2016, 16 pages.

(Continued)

*Primary Examiner* — Manish S Shah
*Assistant Examiner* — Nigel Plumb
(74) *Attorney, Agent, or Firm* — Honeywell International Inc.

(57) ABSTRACT

A flow sensor assembly includes a housing that defines an inlet port, an outlet port, a main channel and a bypass channel. An inlet flow channel fluidly connects the inlet port of the flow sensor assembly to the main channel and an outlet flow channel fluidly connects the main channel to the outlet port. A bypass feeder input channel fluidly connects the main channel to the bypass channel and a bypass feeder output channel fluidly connect the bypass channel to the main channel. In some instances, at least 40 percent of an input pressure differential applied between the inlet port and the outlet port of the flow sensor assembly drops across the inlet flow channel and the outlet flow channel collectively. A sensor is exposed to a fluid in the bypass channel and senses a measure related to a flow rate of the fluid flowing through the bypass channel.

20 Claims, 13 Drawing Sheets

(56) References Cited

U.S. PATENT DOCUMENTS

| | | |
|---|---|---|
| 3,785,206 A | 1/1974 | Benson et al. |
| 3,830,104 A | 8/1974 | Gau |
| 3,838,598 A | 10/1974 | Tompkins |
| 3,895,531 A | 7/1975 | Lambert |
| 3,952,577 A | 4/1976 | Hayes et al. |
| 3,981,074 A | 9/1976 | Yamamoto et al. |
| 4,030,357 A | 6/1977 | Wemyss |
| 4,041,757 A | 8/1977 | Baker et al. |
| 4,100,801 A | 7/1978 | LeMay |
| 4,326,214 A | 4/1982 | Trueblood |
| 4,343,194 A | 8/1982 | Dehart et al. |
| 4,411,292 A | 10/1983 | Schiller |
| 4,418,723 A | 12/1983 | Koni et al. |
| 4,444,060 A | 4/1984 | Yamamoto |
| RE31,570 E | 5/1984 | Drexel |
| 4,478,076 A | 10/1984 | Bohrer |
| 4,478,077 A | 10/1984 | Bohrer et al. |
| 4,481,828 A | 11/1984 | Cheng |
| 4,494,405 A | 1/1985 | Oosuga et al. |
| 4,501,144 A | 2/1985 | Higashi et al. |
| 4,546,655 A | 10/1985 | Victor |
| 4,548,078 A | 10/1985 | Bohrer et al. |
| 4,581,945 A | 4/1986 | Rusz |
| 4,648,270 A | 3/1987 | Johnson et al. |
| 4,653,321 A | 3/1987 | Cunningham et al. |
| 4,655,088 A | 4/1987 | Adams |
| 4,668,102 A | 5/1987 | Mott |
| 4,672,997 A | 6/1987 | Landis et al. |
| 4,677,858 A | 7/1987 | Ohnhaus |
| 4,691,566 A | 9/1987 | Aine |
| 4,696,194 A | 9/1987 | Taylor |
| 4,768,386 A | 9/1988 | Taddeo |
| 4,790,181 A | 12/1988 | Aine |
| 4,800,754 A | 1/1989 | Korpi |
| 4,825,704 A | 5/1989 | Aoshima et al. |
| 4,829,818 A | 5/1989 | Bohrer |
| 4,839,038 A | 6/1989 | Mclain, II |
| 4,856,328 A | 8/1989 | Johnson |
| 4,900,242 A | 2/1990 | Maus et al. |
| 4,916,344 A | 10/1990 | Rodder |
| 4,976,283 A | 12/1990 | Wildfang et al. |
| 5,000,478 A | 3/1991 | Kerastas |
| 5,050,429 A | 9/1991 | Nishimoto et al. |
| 5,063,786 A | 11/1991 | Sanderson et al. |
| 5,063,787 A | 11/1991 | Khuzai et al. |
| 5,081,866 A | 1/1992 | Ochiai et al. |
| 5,088,332 A | 2/1992 | Merilainen et al. |
| 5,107,441 A | 4/1992 | Decker |
| 5,161,410 A | 11/1992 | Davey et al. |
| 5,220,830 A | 6/1993 | Bonne |
| 5,231,877 A | 8/1993 | Henderson |
| 5,249,462 A | 10/1993 | Bonne |
| 5,253,517 A | 10/1993 | Molin et al. |
| 5,295,394 A | 3/1994 | Suzuki |
| 5,303,584 A | 4/1994 | Ogasawara et al. |
| 5,319,973 A | 6/1994 | Crayton et al. |
| 5,332,005 A | 7/1994 | Baan |
| 5,341,841 A | 8/1994 | Schaefer |
| 5,341,848 A | 8/1994 | Laws |
| 5,357,793 A | 10/1994 | Jouwsma |
| 5,379,650 A | 1/1995 | Kofoed et al. |
| 5,385,046 A | 1/1995 | Yamakawa et al. |
| 5,400,973 A | 3/1995 | Cohen |
| 5,404,753 A | 4/1995 | Hecht et al. |
| 5,481,925 A | 1/1996 | Woodbury |
| 5,535,633 A | 7/1996 | Kofoed et al. |
| 5,537,870 A | 7/1996 | Zurek et al. |
| 5,581,027 A | 12/1996 | Juntunen |
| 5,609,303 A | 3/1997 | Cohen |
| 5,634,592 A | 6/1997 | Campau |
| 5,717,145 A | 2/1998 | Yasuhara et al. |
| 5,735,267 A | 4/1998 | Tobia |
| 5,741,968 A | 4/1998 | Arai |
| 5,750,892 A | 5/1998 | Huang et al. |
| 5,763,787 A | 6/1998 | Gravel et al. |
| 5,781,291 A | 7/1998 | So et al. |
| 5,736,651 A | 8/1998 | Bowers |
| 5,789,660 A | 8/1998 | Kofoed et al. |
| 5,792,958 A | 8/1998 | Speldrich |
| 5,817,950 A | 10/1998 | Wiklund et al. |
| 5,829,685 A | 11/1998 | Cohen |
| 5,844,135 A | 12/1998 | Brammer et al. |
| 5,861,561 A | 1/1999 | Van Cleve et al. |
| 5,866,824 A | 2/1999 | Schieber |
| 5,942,694 A | 8/1999 | Robins et al. |
| 6,044,716 A | 4/2000 | Yamamoto |
| 6,119,730 A | 9/2000 | McMillan |
| 6,128,963 A | 10/2000 | Bromster |
| 6,142,014 A | 11/2000 | Rilling |
| 6,164,143 A | 12/2000 | Evans |
| 6,247,495 B1 | 6/2001 | Yamamoto et al. |
| 6,308,553 B1 | 10/2001 | Bonne et al. |
| 6,312,389 B1 | 11/2001 | Kofoed et al. |
| 6,322,247 B1 | 11/2001 | Bonne et al. |
| 6,526,822 B1 | 3/2003 | Maeda et al. |
| 6,527,385 B2 | 3/2003 | Koitabashi et al. |
| 6,543,449 B1 | 4/2003 | Woodring et al. |
| 6,553,808 B2 | 4/2003 | Bonne et al. |
| 6,561,021 B2 | 5/2003 | Uramachi et al. |
| 6,579,087 B1 | 6/2003 | Vrolijk |
| 6,591,674 B2 | 7/2003 | Gehman et al. |
| 6,655,207 B1 | 12/2003 | Speldrich et al. |
| 6,681,623 B2 | 1/2004 | Bonne et al. |
| 6,715,339 B2 | 4/2004 | Bonne et al. |
| 6,729,181 B2 | 5/2004 | Mayer et al. |
| 6,742,399 B2 | 6/2004 | Kunz et al. |
| 6,761,165 B2 | 7/2004 | Strickland, Jr. |
| 6,769,299 B2 | 8/2004 | Forster et al. |
| 6,779,393 B1 | 8/2004 | Muller et al. |
| 6,779,395 B2 | 8/2004 | Hornung et al. |
| 6,826,966 B1 | 12/2004 | Karbassi et al. |
| 6,871,534 B1 | 3/2005 | Hamada et al. |
| 6,871,537 B1 | 3/2005 | Gehman et al. |
| 6,886,401 B2 | 5/2005 | Ito et al. |
| 6,901,795 B2 | 6/2005 | Naguib et al. |
| 6,904,799 B2 | 6/2005 | Cohen et al. |
| 6,904,907 B2 | 6/2005 | Speldrich et al. |
| 6,907,787 B2 | 6/2005 | Cook et al. |
| 6,915,682 B2 | 7/2005 | Renninger et al. |
| 6,928,865 B2 | 8/2005 | Ito et al. |
| 6,957,586 B2 | 10/2005 | Sprague |
| 7,000,298 B2 | 2/2006 | Cook et al. |
| 7,000,612 B2 | 2/2006 | Jafari et al. |
| 7,028,560 B2 | 4/2006 | Castillon Levano |
| 7,032,463 B2 | 4/2006 | Misholi et al. |
| 7,036,366 B2 | 5/2006 | Emmert et al. |
| 7,043,978 B2 | 5/2006 | Goka et al. |
| 7,059,184 B2 | 6/2006 | Kanouda et al. |
| 7,082,825 B2 | 8/2006 | Aoshima et al. |
| 7,100,440 B2 | 9/2006 | Morisawa et al. |
| 7,100,454 B2 | 9/2006 | Hasunuma |
| 7,107,834 B2 | 9/2006 | Meneghini et al. |
| 7,121,139 B2 | 10/2006 | Shajii et al. |
| 7,243,541 B1 | 7/2007 | Bey et al. |
| 7,258,003 B2 | 8/2007 | Padmanabhan et al. |
| 7,278,309 B2 | 10/2007 | Dmytriw et al. |
| 7,278,326 B2 | 10/2007 | Kobayashi et al. |
| 7,305,877 B2 | 12/2007 | Beyrich et al. |
| 7,337,677 B2 | 3/2008 | Mizohata |
| 7,343,823 B2 | 3/2008 | Speldrich |
| 7,347,785 B2 | 3/2008 | Worman, Jr. et al. |
| 7,353,719 B2 | 4/2008 | Hiura et al. |
| 7,373,819 B2 | 5/2008 | Engler et al. |
| 7,383,726 B2 | 6/2008 | Ike et al. |
| 7,386,166 B2 | 6/2008 | Curry et al. |
| 7,430,918 B2 | 10/2008 | Selvan et al. |
| 7,454,984 B1 | 11/2008 | Ross et al. |
| 7,464,611 B2 | 12/2008 | Matter et al. |
| 7,472,580 B2 | 1/2009 | Lyons et al. |
| 7,479,255 B2 | 1/2009 | Otani et al. |
| 7,513,149 B1 | 4/2009 | Ricks |
| 7,516,761 B2 | 4/2009 | Setescak |
| 7,520,051 B2 | 4/2009 | Becke et al. |
| 7,549,322 B2 | 6/2009 | Yamashita et al. |

(56) References Cited

U.S. PATENT DOCUMENTS

| | | | |
|---|---|---|---|
| 7,568,383 B2 | 8/2009 | Colvin et al. | |
| 7,603,898 B2 | 10/2009 | Speldrich | |
| 7,631,562 B1 | 12/2009 | Speldrich | |
| 7,647,835 B2 | 1/2010 | Speldrich | |
| 7,654,157 B2 | 2/2010 | Speldrich | |
| 7,661,303 B2 | 2/2010 | Kohno et al. | |
| 7,698,938 B2 | 4/2010 | Inagaki et al. | |
| 7,698,958 B2 | 4/2010 | Matter et al. | |
| 7,704,774 B2 | 4/2010 | Mayer et al. | |
| 7,730,793 B2 | 6/2010 | Speldrich | |
| 7,757,553 B2 | 7/2010 | Meier et al. | |
| 7,765,865 B2 | 8/2010 | Ike et al. | |
| 7,793,410 B2 | 9/2010 | Padmanabhan et al. | |
| 7,805,986 B2 | 10/2010 | Colvin et al. | |
| 7,832,269 B2 | 11/2010 | Bey, Jr. et al. | |
| 7,878,980 B2 | 2/2011 | Ricciardelli | |
| 7,891,238 B2 | 2/2011 | Becke et al. | |
| 7,892,488 B2 | 2/2011 | Speldrich et al. | |
| 8,113,046 B2 | 2/2012 | Speldrich et al. | |
| 8,418,549 B2 | 4/2013 | Speldrich et al. | |
| 8,485,031 B2 | 7/2013 | Speldrich et al. | |
| 8,695,417 B2 | 4/2014 | Speldrich et al. | |
| 9,091,577 B2 | 7/2015 | Speldrich et al. | |
| 2002/0078744 A1 | 6/2002 | Gehman et al. | |
| 2003/0062045 A1 | 4/2003 | Woodring et al. | |
| 2004/0118200 A1 | 6/2004 | Hornung et al. | |
| 2004/0163461 A1 | 8/2004 | Ito et al. | |
| 2004/0177703 A1 | 9/2004 | Schumacher et al. | |
| 2005/0016534 A1 | 1/2005 | Ost | |
| 2005/0039809 A1 | 2/2005 | Speldrich | |
| 2005/0235757 A1 | 10/2005 | De Jonge et al. | |
| 2005/0247106 A1 | 11/2005 | Speldrich et al. | |
| 2005/0247107 A1 | 11/2005 | Speldrich et al. | |
| 2006/0017207 A1 | 1/2006 | Bechtold et al. | |
| 2006/0201247 A1 | 9/2006 | Speldrich et al. | |
| 2006/0225488 A1 | 10/2006 | Speldrich | |
| 2007/0176010 A1 | 8/2007 | Figi et al. | |
| 2007/0295068 A1 | 12/2007 | Kozawa et al. | |
| 2008/0163683 A1 | 7/2008 | Becke et al. | |
| 2008/0202929 A1 | 8/2008 | Chapples et al. | |
| 2008/0250854 A1* | 10/2008 | Ding | G01F 1/48 73/198 |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2010/0269583 A1 | 10/2010 | Jasnie | |
| 2011/0226052 A1 | 9/2011 | Speldrich et al. | |
| 2011/0226053 A1 | 9/2011 | Sorenson et al. | |
| 2011/0247411 A1 | 10/2011 | Speldrich | |
| 2012/0035866 A1 | 2/2012 | Qasimi et al. | |
| 2012/0186336 A1* | 7/2012 | Speldrich | B01D 17/10 73/201 |
| 2012/0192642 A1 | 8/2012 | Speldrich et al. | |
| 2013/0098486 A1* | 4/2013 | Speldrich | F17D 1/00 137/601.18 |
| 2013/0199289 A1* | 8/2013 | Hornung | G01F 1/6842 73/202 |
| 2013/0205892 A1* | 8/2013 | Ueda | G01F 1/6842 73/202 |
| 2015/0027558 A1* | 1/2015 | Kehoe | G01F 1/6965 137/15.01 |

FOREIGN PATENT DOCUMENTS

| | | |
|---|---|---|
| EP | 0094497 | 11/1983 |
| EP | 0255056 | 2/1988 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| EP | 2703787 A1 | 3/2014 |
| FR | 377743 | 3/1907 |
| GB | 2123564 | 2/1984 |
| JP | 49120131 | 11/1974 |
| JP | 58221119 | 12/1983 |
| JP | 3099230 | 4/1991 |
| JP | 4069521 | 3/1992 |
| JP | 7083713 | 3/1995 |
| JP | 10239130 | 9/1998 |
| JP | 1030747 | 11/1998 |
| WO | WO 92/21940 | 12/1992 |
| WO | WO 93/15373 | 8/1993 |
| WO | WO 95/17651 | 6/1995 |
| WO | WO 01/11322 | 2/2001 |
| WO | WO 01/61282 | 8/2001 |
| WO | WO 01/98736 | 12/2001 |
| WO | WO 2006/131531 | 12/2006 |
| WO | WO 2007/095528 | 8/2007 |
| WO | WO 2007/137978 | 12/2007 |
| WO | WO 2008/070603 | 6/2008 |

OTHER PUBLICATIONS

"Schematic Cross-Section for AWM43600," 1 page, prior to Jan. 31, 2011.

Bodycote, "Competitive Teardown Analysis of Sensirion EMI," Bodycote Testing Group, 24 pages, Oct. 15, 2007.

Bodycote, "Honeywell Sensing and Control, Sensiron SDP610 Competitive Teardown Analysis," 15 pages, Feb. 19, 2009.

Search Report for Corresponding EP Application No. 12153190.9-1234 dated Jun. 5, 2012.

Honeywell, "Airflow Sensors Line Guide," 6 pages, Apr. 2010.

Honeywell, "Airflow Sensors Line Guide," 6 pages, Nov. 2010.

Honeywell, "Airflow, Force and Pressure Sensors," Product Range Guide, 20 pages, Mar. 2011.

Honeywell, "Airflow, Force, and Pressure Sensors," Product Range Guide, 20 pages, Apr. 2010.

Honeywell, "AWM43600V, Issue No. 4," 1 page, Jul. 29, 1996.

Honeywell, "AWM43600V, Part No. SS12177," 1 page, Jul. 10, 1998.

Honeywell, "Housing, Flowtube, Drawing 50005182," 1 page, Sep. 2, 2004.

Honeywell, "Housing, Plastic, Drawing 050.1.156," 1 page, Jul. 8, 1998.

Honeywell, "Housing, Subassembly, Drawing SS-12148," 1 page, Oct. 14, 1998.

Honeywell, "Mass Airflow Sensors, AWM720P1 Airflow," 4 pages, prior to Mar. 22, 2010.

Honeywell, "Mass Airflow Sensors, AWM9000 Airflow," 6 pages, 2003.

Honeywell, "Reference and Application Data, Microbridge Airflow Sensors," 1 page, prior to Mar. 22, 2010.

Honeywell, "Sensing and Control Interactive Catalog," 4 pages, prior to Mar. 22, 2010.

Honeywell, "Tubing, Plastic, Drawing SS-12062," 1 page, Apr. 5, 1999.

Honeywell, "Tubing, Plastic, Drawing SS-12160," 1 page, drawn Jan. 28, 1998.

* cited by examiner

FLOW SENSOR

TECHNICAL FIELD

The disclosure relates generally to sensors, and more particularly to flow sensors.

BACKGROUND

Sensors are used in a wide variety of applications including residential, industrial, automotive, military, medical, aeronautical, space, as well as countless other applications. One particularly type of sensor is a flow sensor for measuring a flow rate of a fluid. What would be desirable is a flow sensor that can operate across a relatively large pressure drop while retaining a small footprint.

SUMMARY

This disclosure relates generally to sensors such as flow sensors. An illustrative flow sensor assembly may include a housing that defines an inlet port and an outlet port. The housing may define a main channel having a main channel input and a main channel output and a bypass channel having a bypass channel input and a bypass channel output. An inlet flow channel may fluidly connect the inlet port of the flow sensor assembly to the main channel input and an outlet flow channel may fluidly connect the main channel output to the outlet port of the flow sensor assembly. A bypass feeder input channel may fluidly connect the main channel input to the bypass channel input and a bypass feeder output channel may fluidly connect the bypass channel output to the main channel output. In some instances, the housing may be configured such that at least 40 percent of an input pressure differential applied between the inlet port and the outlet port of the flow sensor assembly drops across the inlet flow channel and the outlet flow channel collectively. The flow sensor assembly may include a sensor exposed to a fluid flow in the bypass channel and may be configured to sense a measure related to a flow rate of the fluid flowing through the bypass channel.

In some instances, the disclosure pertains to a flow sensor that includes a housing having an inlet port, an outlet port and a sensing channel in fluid communication with the inlet port and the outlet port. The housing may have a mounting footprint of less than 200 mm². In some cases, the housing may be configured to accept an input differential pressure of at least 1000 Pa across the inlet port and the outlet port, while providing a flow in the sensing channel of less than 200 Standard Cubic Centimeters per Minute (SCCM) and laminarized at a Reynolds number of less than 150.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
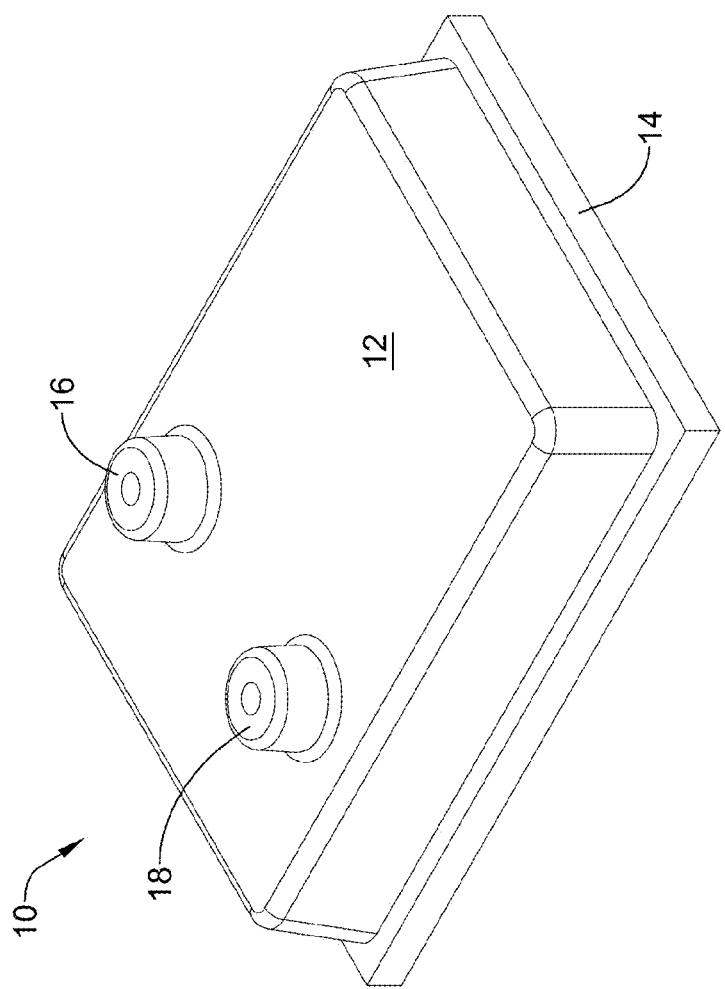
FIG. 1 is a perspective view of an illustrative flow sensor.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. References to "over," "under," "top," and "bottom," etc., are relative terms and are made herein with respect to the drawings and do not necessarily correspond to any particular orientation in actual physical space. The description and drawings show several examples that are meant to be illustrative in nature.

FIG. 1 is a perspective view of an illustrative sensor 10. While the sensor 10 will be described herein as being a flow sensor, it will be appreciated that sensor 10 may be any suitable type of sensor, including a pressure sensor, a thermal conductivity sensor, a temperature sensor, a humidity sensor, a chemical sensor, and/or any combination of these or other sensors. As seen in FIG. 1, the illustrative sensor 10 includes a housing 12 and a circuit board 14. The housing 12 defines a fluid inlet 16 and a fluid outlet 18. It will be appreciated that in some cases, definition of which opening forms the fluid inlet 16 and which forms the fluid outlet 18 is arbitrary as in some cases the fluid channels within the housing 12, to be discussed, may be symmetric and the flow sensor may be capable of measuring flow rate equally well in either flow direction.

Figure 2:
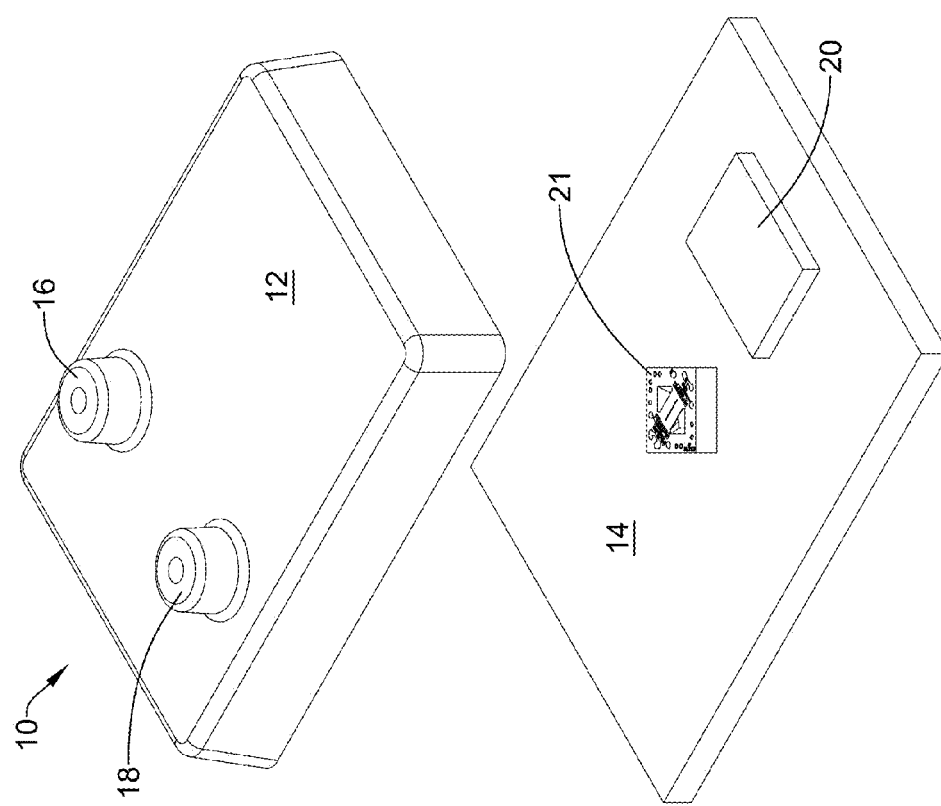
FIG. 2 is an exploded perspective view of the illustrative flow sensor of FIG. 1.

FIG. 2 is an exploded view of the illustrative sensor 10 in which the housing 12 has been moved away from the circuit board 14. It can be seen that the circuit board 14 includes a sense die 21 and a circuit 20. The circuit 20 may include whatever circuitry is appropriate to receive an electrical signal from the sense die 21 and to output a signal representative of whatever the sensor 10 is configured to sense, detect or measure. While the circuit 20 is illustrated in black box fashion as a single block, it will be appreciated that the circuit 20 may include one or more distinct ICs or other electrical components, as appropriate. Moreover, it is contemplated that the circuit board 14 may have traces (not explicitly shown) for interconnecting various components on the circuit board 14.

Figure 3:
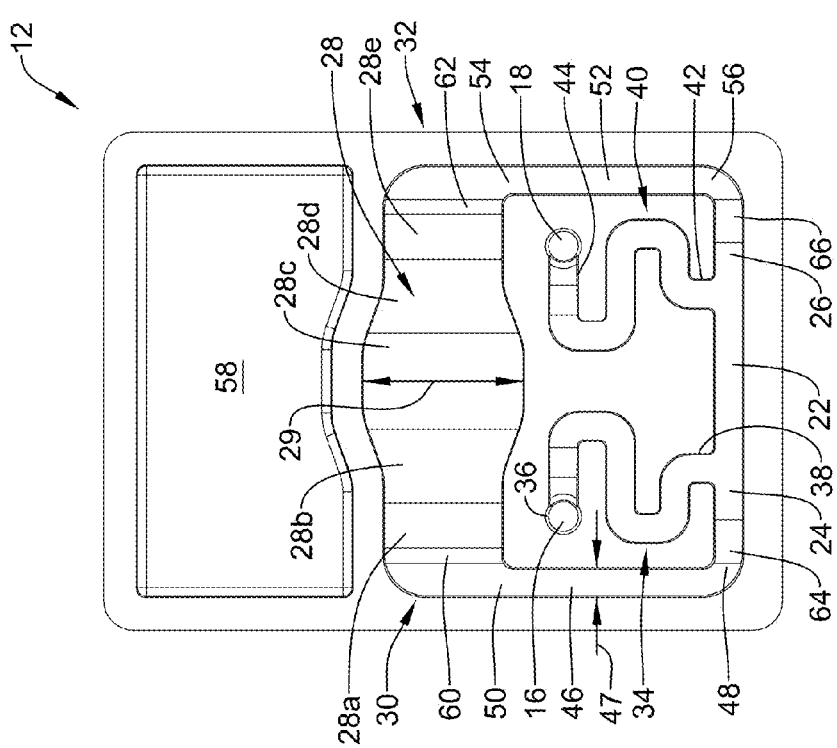
FIG. 3 is a plan view of a housing used in the illustrative flow sensor of FIG. 1.
Figure 4:
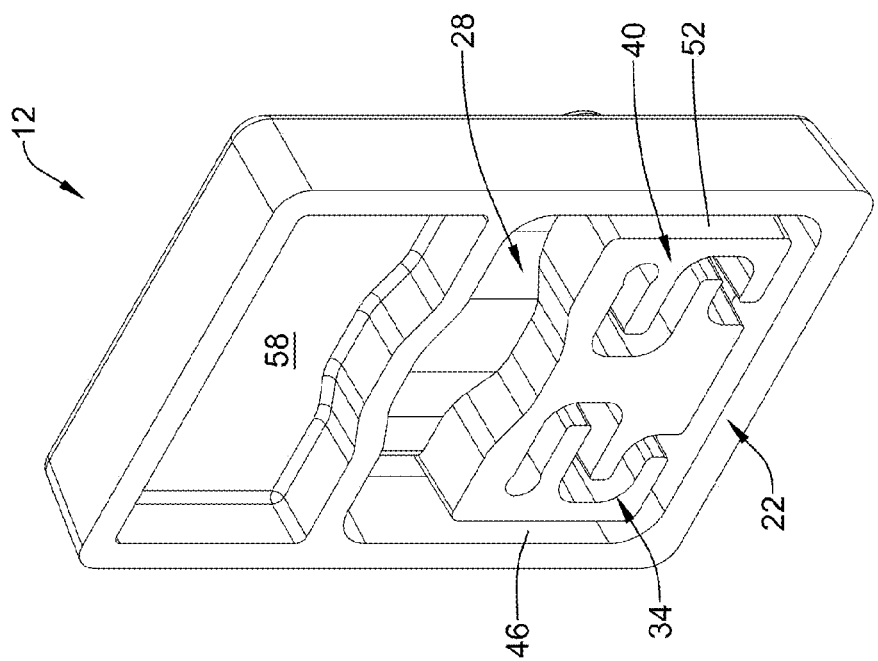
FIG. 4 is a perspective view of the housing used in the illustrative flow sensor of FIG. 1.

FIG. 3 is a plan view and FIG. 4 is a perspective view of the interior of the housing 12 that, when assembled into the illustrative sensor 10, faces the circuit board 14. As illustrated, fluid enters through the fluid inlet 16 and exits through the fluid outlet 18. The housing 12 defines a main channel 22 having a main channel input 24 and a main channel output 26. A bypass channel 28 has a bypass channel input 30 and a bypass channel output 32. An inlet flow channel 34 has an inlet flow channel inlet 36 and an inlet flow channel outlet 38. The inlet flow channel 34 is fluidly connected via the inlet flow channel inlet 36 to the inlet fluid port 16 and to the main channel input 24 via the inlet flow channel outlet 38, as illustrated, thereby fluidly connecting the inlet port 16 to the main channel input 24. An outlet flow channel 40 has an outlet flow channel inlet 42 and an outlet flow channel outlet 44. The outlet flow channel 40 is fluidly connected via the outlet flow channel inlet 42 to the main channel output 26 and to the outlet port 18 via the outlet flow channel outlet 44, thereby fluidly connecting the main channel output 26 to the outlet port 18.

The illustrative housing 12 further defines a bypass feeder input channel 46 including a bypass feeder input channel inlet 48 and a bypass feeder input channel outlet 50. The bypass feeder input channel 46 is fluidly connected to the main channel input 24 via the bypass feeder input channel inlet 48 and to the bypass channel input 30 via the bypass feeder input channel outlet 50 and thus fluidly connects the main channel input 24 to the bypass channel input 30. A bypass feeder outlet channel 52 includes a bypass feeder output channel input 54 and a bypass feeder output channel output 56. The bypass feeder outlet channel 52 is fluidly connected to the bypass channel output 32 via the bypass feeder output channel input 54 and to the main channel output 26 via the bypass feeder output channel output 56, thereby fluidly connecting the bypass channel output 32 to the main channel output 26.

It will be appreciated that fluid entering via the fluid inlet port 16 will pass through the inlet flow channel 34. A portion of the entering fluid will pass into the main channel 22 and the remainder of the fluid will pass into the bypass feeder input channel 46 and thus through the bypass channel 28. The fluid passing through the main channel 22 will pass through the outlet flow channel 40 and exit through the fluid outlet port 18. The fluid passing through the bypass channel 28 will pass through the bypass feeder outlet channel 52 and through the outlet flow channel 40 and exit through the fluid outlet port 18. In some instances, at least 50 percent of fluid entering the fluid inlet port 16 will pass through the main channel 22. In some cases, at least 60 percent of fluid entering the fluid inlet port 16 will pass through the main channel 22. In some instances, at least 70 percent of fluid entering the fluid inlet port 16 will pass through the main channel 22. In some cases, at least 80 percent of fluid entering the fluid inlet port 16 will pass through the main channel 22.

In some cases, the bypass channel 28 in combination with the bypass feeder input channel 46 and the bypass feeder outlet channel 52 may be considered a bypass circuit (or sensing channel). In some cases, the relative size and/or shape of the main channel 22 and the bypass circuit may be configured to facilitate or control relative fluid flow through the main channel 22 and the bypass channel 28. In some instances, the bypass feeder input channel 46 and/or the bypass feeder outlet channel 52 may be configured to help determine the relative amount of flow through the main channel 22 versus the bypass channel 28. In some cases, the bypass circuit may presents a pneumatic resistance that is at least three times greater than the pneumatic resistance of the main channel. Also, in some cases, the collective pneumatic resistance of the inlet flow channel 34 and the outlet flow channel 40 may be at least two times greater than the pneumatic resistance of the main channel 22.

Moreover, in some instances, the bypass feeder input channel 46, the bypass feeder outlet channel 52 and/or the bypass channel 28 may be configured to help laminarize fluid flow in the bypass channel 28 adjacent the sensor. For example, the bypass feeder input channel 46 and the bypass feeder outlet channel 52 may each have a length that is at least three times their hydraulic diameter up to about ten times their hydraulic diameter. In some cases, the bypass feeder input channel 46 and the bypass feeder outlet channel 52 may each extends along a straight path along at least a majority of their length. In some cases, the at least 60% of each of the bypass feeder input channel 46 and the bypass feeder outlet channel 52 extend along a straight path. In some cases, the at least 70% of each of the bypass feeder input channel 46 and the bypass feeder outlet channel 52 extend along a straight path. In some cases, the at least 80% of each of the bypass feeder input channel 46 and the bypass feeder outlet channel 52 extend along a straight path. In some cases, the at least 90% of each of the bypass feeder input channel 46 and the bypass feeder outlet channel 52 extend along a straight path.

The inlet flow channel 34 and/or the outlet flow channel 40 may be configured to help create a pressure drop between the fluid inlet port 16 and the fluid outlet port 18. In some instances, the inlet flow channel 34 and/or the outlet flow channel 40 may each have a circuitous path that enables a longer effective length, or longer path for fluid to flow through, in a given footprint area. In some cases, as illustrated, the inlet flow channel 34 and the outlet flow channel 40 may be symmetric with respect to teach other. In some cases, the inlet flow channel 34 and the outlet flow channel 40 may have symmetric path shapes and the same hydraulic diameter relative to the other, as shown in FIG. 3. In other cases, one of the inlet flow channel 34 and the outlet flow channel 40 may be relatively longer while the other of the inlet flow channel 34 and the outlet flow channel 40 may be relatively shorter. In some cases, the inlet flow channel 34 and the outlet flow channel 40 may have an asymmetric path shape and/or different hydraulic diameter relative to the other. When so provided, the flow sensor 10 may not be a "bidirectional" flow sensor that is independent of flow direction through the fluid inlet port 16 and the fluid outlet port 18.

In some cases, at least 20 percent of a pressure drop between the fluid inlet port 16 and the fluid outlet port 18 occurs across the inlet flow channel 34 and the outlet flow channel 40 collectively. In some instances, at least 30 percent of a pressure drop between the fluid inlet port 16 and the fluid outlet port 18 occurs across the inlet flow channel 34 and the outlet flow channel 40 collectively. In some cases, at least 40 percent of a pressure drop between the fluid inlet port 16 and the fluid outlet port 18 occurs across the inlet flow channel 34 and the outlet flow channel 40 collectively. In some instances, at least 50 percent of a pressure drop between the fluid inlet port 16 and the fluid outlet port 18 occurs across the inlet flow channel 34 and the outlet flow channel 40 collectively. In some cases, at least 60 percent of a pressure drop between the fluid inlet port 16 and the fluid outlet port 18 occurs across the inlet flow channel 34 and the outlet flow channel 40 collectively. In some instances, at least 70 percent of a pressure drop between the fluid inlet port 16 and the fluid outlet port 18 occurs across the inlet flow channel 34 and the outlet flow channel 40 collectively. In some cases, at least 80 percent of a pressure drop between the fluid inlet port 16 and the fluid outlet port 18 occurs across the inlet flow channel 34 and the outlet flow channel 40 collectively.

In some cases, the inlet flow channel 34 has a minimum cross-sectional area that is within 20 percent of the minimum cross-sectional area of the main channel 22, and the inlet flow channel 34 has a length that is greater than the length of the main channel 22. In some cases, the outlet flow channel 40 has a minimum cross-sectional area that is within 30 percent of the minimum cross-sectional area of the main channel 22, and the outlet flow channel 40 has a length that is greater than the length of the main channel 22. In some cases, the bypass feeder input channel 46 has a minimum channel width, and the minimum channel width of the bypass feeder input channel 46 is within 20 percent of the minimal channel width of the main channel 22. In some cases, the bypass feeder outlet channel 52 has a minimum channel width, and the minimum channel width of the bypass feeder input channel 46 is within 20 percent of the minimal channel width of the main channel 22. In some cases, the inlet flow channel 34 has a minimum channel width, and the minimum channel width of the inlet flow channel 34 is within 20 percent of the minimal channel width of the main channel 22. In some cases, the outlet flow channel 40 has a minimum channel width, and the minimum channel width of the outlet flow channel 40 is within 20 percent of the minimal channel width of the main channel 22.

As noted, the bypass channel 28 in combination with the bypass feeder input channel 46 and the bypass feeder outlet channel 52 may be considered as forming a bypass circuit. In some instances, the individual components of the bypass circuit may each have a hydraulic diameter that is within about 20 percent or less of the hydraulic diameter of the other components. In some cases, the hydraulic diameter of each component of the bypass circuit may be within about 30 percent of the hydraulic diameter of all other components. In this, hydraulic diameter may be considered indicative of the fluid flow capacity of the component, and may be represented by a cross-sectional area of each flow path. The phrase hydraulic "diameter" is not intended to imply or limit the cross-sectional shape of the flow path to a circular shape, although it could have a circular cross-sectional shape. In the example shown in FIG. 3, the cross-sectional shape of the flow paths are not circular.

The bypass circuit may be configured to help control and regulate fluid flow. For example, the bypass channel 28 itself has a width 29 that is at least twice that of the width 47 of the bypass feeder input channel 46 and/or the bypass feeder outlet channel 52. The bypass channel 28 may have a width 29 that is at least three times that of the bypass feeder input channel 46 and/or the bypass feeder outlet channel 52. It will be appreciated that the bottom surface of the bypass channel 28 may have a stepped profile. As illustrated, the bottom surface of the bypass channel 28 includes a first flat portion 28a, a stepped up portion 28b, a second flat portion 28c having a reduced channel height relative to the first flat portion 28a, a stepped down portion 28d and a second flat portion 28e that is at the same height as the first flat portion 28a. As can be appreciated, the illustrated embodiment is symmetric such that it does not matter which port is used as the fluid inlet port 16 and which port is used as the fluid outlet port 18. In some cases, a center portion of the bypass channel 28 may have a width 29 that is further enlarged to accommodate the sense die 21 (FIG. 2).

In some cases, the housing 12 may include a recess 58 that is sized and configured to accommodate structures on the circuit board 14, such as the circuit 20. In some instances, the housing 12 may be molded to include the fluid channels shown in FIGS. 3 and 4. In some cases, the housing 12 may be formed from a solid block of material and each of the fluid channels shown may be drilled or otherwise milled into the solid block of material. In some cases, the housing 12 is formed of a polymeric material such that it is low cost and easy to manufacture.

In some cases, the housing 12 may include additional structure that helps to control and regulate relative fluid flow, pressure drops, fluid velocity and the like. For example, the bypass channel 28 may include a rounded height step up 60 that is disposed adjacent the first flat portion 28a and/or a rounded height step down 62 that is disposed adjacent the second flat portion 28d. Similarly, there may be a rounded height step down 64 that is disposed between the main channel 22 and the bypass feeder input channel 46 and/or a rounded height step down 66 that is disposed between the main channel 22 and the bypass feeder outlet channel 52.

Figure 5:
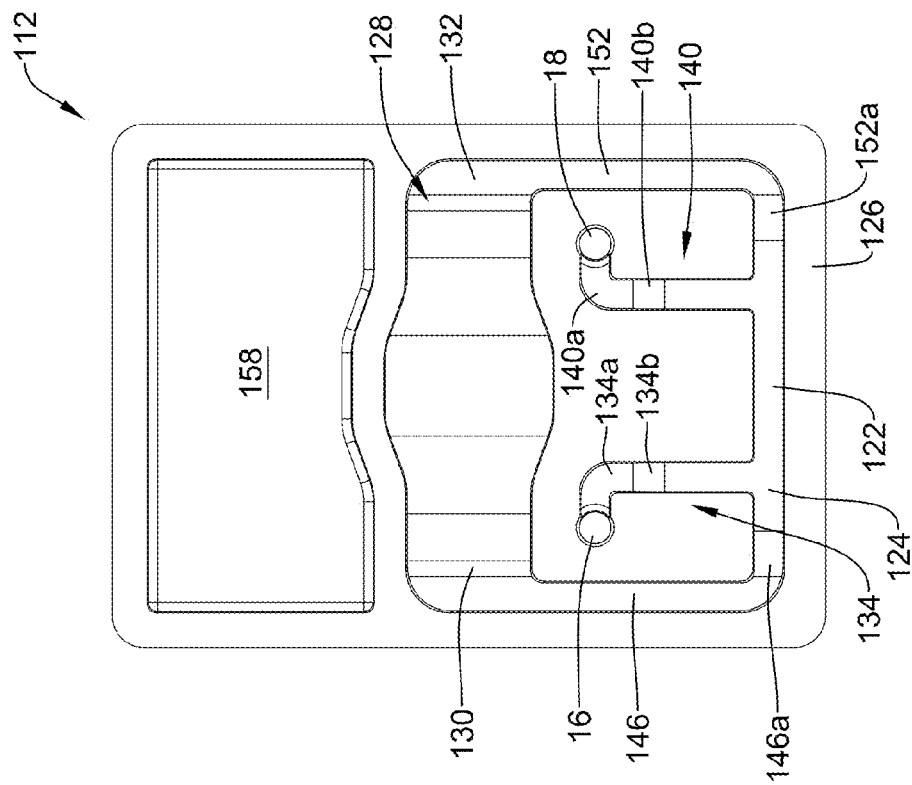
FIG. 5 is a plan view of another housing usable in the illustrative flow sensor of FIG. 1.
Figure 6:
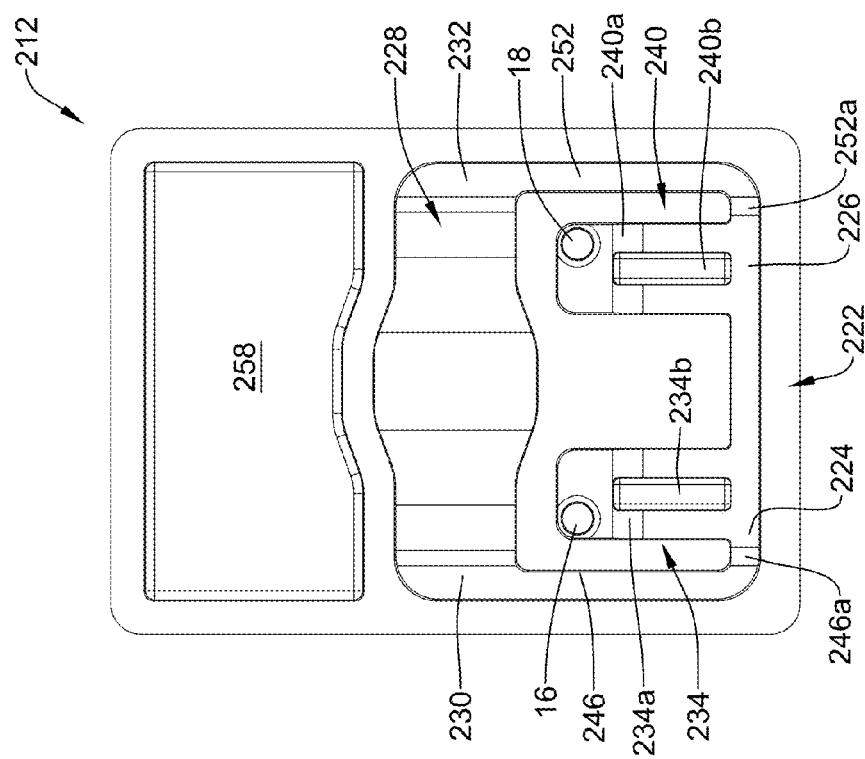
FIG. 6 is a plan view of another housing usable in the illustrative flow sensor of FIG. 1.

The housing 12 shown in FIGS. 3 and 4 may be configured to accommodate a relatively high pressure drop between the fluid inlet port 16 and the fluid outlet port 18, while still providing a good flow measurement with a relatively low noise and a relatively small mounting footprint. In one example, the pressure drop between the fluid inlet port 16 and the fluid outlet port 18 may be about 1200 Pascals (Pa), or about 1000 Pa. In other embodiments, the sensor may be designed for a lower pressure drop. FIG. 5 illustrates a housing 112 designed for a pressure drop of about 500 Pa while FIG. 6 shows a housing 212 designed for a pressure drop of about 250 Pa. The mounting footprint, which can be represented by the outermost extent of the plan view of housing 12 shown in FIG. 3, may be 200 mm$^2$ or less, but this is just one example. In some cases, the mounting footprint may be, for example, 180 mm$^2$ or less, 150 mm$^2$ or less, 140 mm$^2$ or less, 120 mm$^2$ or less, 100 mm$^2$ or less, 80 mm$^2$ or less, of 50 mm$^2$ or less. In some cases, the mounting footprint may be 12 mm or less by 9 mm or less. In some cases, the housing 12 may be mounted to a substrate in an assembly with the backside of the housing 12 in FIG. 3 facing the substrate.

In some cases, the housing 12 is configured to accept an input differential pressure of at least 1000 Pa across the inlet port 16 and the outlet port 18, while providing a flow in the bypass channel 28 adjacent the sensor of less than 200 Standard Cubic Centimeters per Minute (SCCM) and laminarized at a Reynolds number of less than 150 in the bypass feeder channel 46. In some cases, the housing 12 is configured to accept an input differential pressure of at least 1200 Pa across the inlet port 16 and the outlet port 18, while providing a flow in the bypass channel 28 adjacent the sensor of less than 150 Standard Cubic Centimeters per Minute (SCCM) and laminarized at a Reynolds number of less than 150 in the bypass feeder channel 46. These are just examples.

FIG. 5 illustrates a housing 112 configured for a pressure drop of about 500 Pa between the fluid inlet port 16 and the fluid outlet port 18. The housing 112 may, for example, be used in combination with the circuit board 14 described previously. Many of the components are similar to those described with respect to FIGS. 3 and 4. The illustrative housing 112 defines a main channel 122 having a main channel input 124 and a main channel output 126. A bypass channel 128 has a bypass channel input 130 and a bypass channel output 132. An inlet flow channel 134 is fluidly connected to the inlet fluid port 16 and to the main channel input 124. An outlet flow channel 140 is fluidly connected to the main channel output 126 and to the outlet port 18. The housing 112 defines a bypass feeder inlet channel 146 that is fluidly connected to the main channel input 124 and to the bypass channel input 130. A bypass feeder outlet channel 152 is fluidly connected to the bypass channel output 132 and to the main channel output 126.

The inlet flow channel 134 and/or the outlet flow channel 140 may be configured to help create a pressure drop between the fluid inlet port 16 and the fluid outlet port 18. As illustrated, the inlet flow channel 134 includes a single bend 134a and a height step up 134b, which helps reduce the hydraulic diameter of the inlet flow channel 134 at the height step up 134b. Similarly, the outlet flow channel 140 includes a single bend 140a and a height step up 140b. In some cases, as shown, there is a height step down 146a between the main channel 122 and the bypass feeder inlet channel 146. Likewise, there may be a height step down 152a between the main channel 122 and the bypass feeder outlet channel 152.

FIG. 6 illustrates a housing 212 configured for a pressure drop of about 250 Pa between the fluid inlet port 16 and the fluid outlet port 18. The illustrative housing 212 may, for example, be used in combination with the circuit board 14 described previously. Many of the components are similar to those described with respect to FIGS. 3 and 4. The housing 212 defines a main channel 222 having a main channel input 224 and a main channel output 226. A bypass channel 228 has a bypass channel input 230 and a bypass channel output 232. An inlet flow channel 234 is fluidly connected to the inlet fluid port 16 and to the main channel input 224. An outlet flow channel 240 is fluidly connected to the main channel output 226 and to the outlet port 18. The housing 212 defines a bypass feeder inlet channel 246 that is fluidly connected to the main channel input 224 and to the bypass channel input 230. A bypass feeder outlet channel 252 is fluidly connected to the bypass channel output 232 and to the main channel output 226. In some embodiments, depending on the pressure drop between the fluid inlet port 16 and the fluid outlet port 18, it may be possible to exclude the main channel 222.

The inlet flow channel 234 and/or the outlet flow channel 240 may be configured to help create a pressure drop between the fluid inlet port 16 and the fluid outlet port 18. As illustrated, the inlet flow channel 234 includes a height step up 234a that reduces the depth of the inlet flow channel 234 as well as a divider 234b that helps laminarize flow through the inlet flow channel 234. Similarly, the outlet flow channel 240 includes a height step up 240a and a divider 240b. In some cases, as shown, there is a height step down 246a between the main channel 222 and the bypass feeder inlet channel 246. Likewise, there may be a height step down 252a between the main channel 222 and the bypass feeder outlet channel 252.

Figure 7:
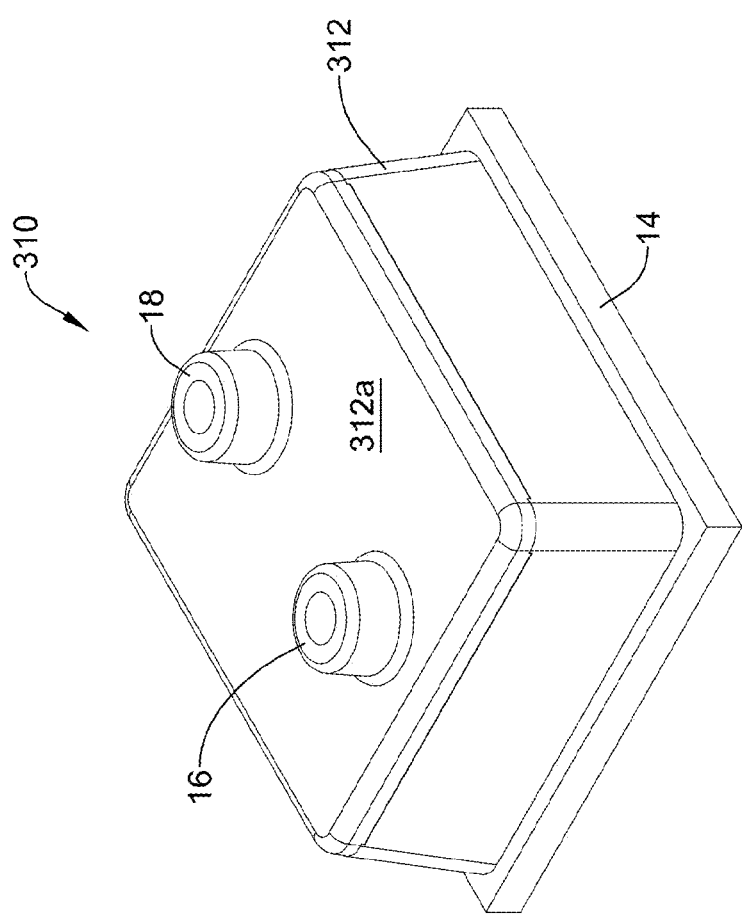
FIG. 7 is a perspective view of an illustrative flow sensor.
Figure 8:
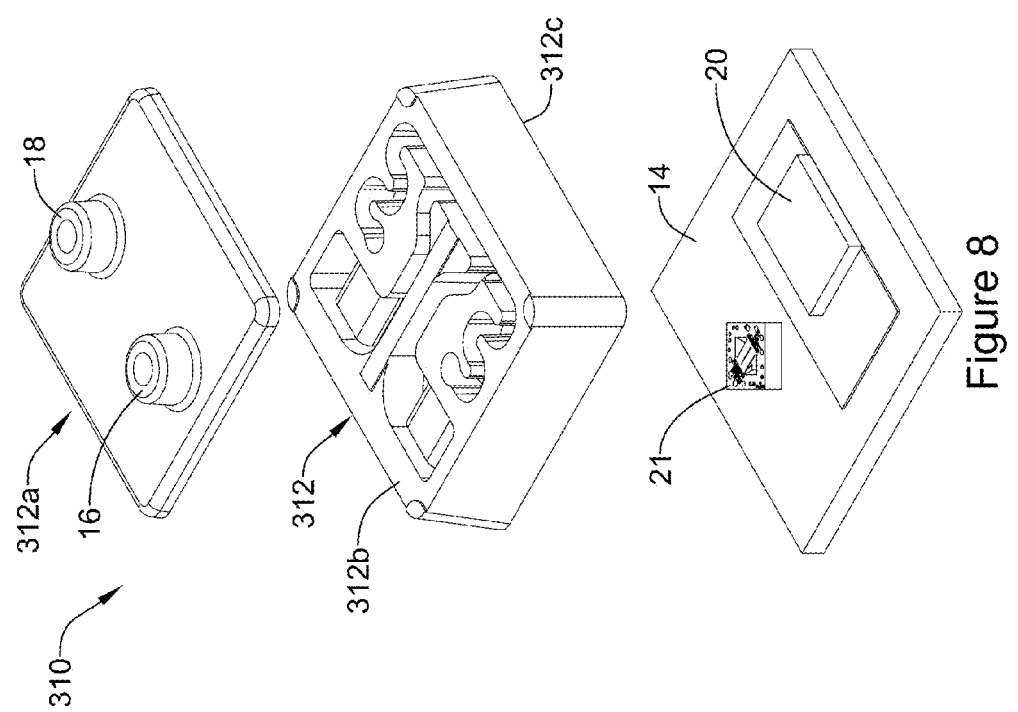
FIG. 8 is an exploded perspective view of the illustrative flow sensor of FIG. 7.

FIGS. 3 through 6 have illustrated features of a unitary or single piece housing 12, 112, and 212. In some instances, a fluid sensor may include a two piece housing that provides a smaller mounting footprint by placing a main flow channel and a bypass flow channel on opposite sides of a molded housing. FIG. 7 is a perspective view of an illustrative fluid sensor 310 that includes a circuit board 14, a housing 312 and a housing cover 312a. In this illustrative embodiment, the housing cover provides the fluid inlet port 16 and the fluid outlet port 18. FIG. 8 is an exploded view of the fluid sensor 310 of FIG. 7. Details of the housing 312 are described with reference to FIG. 9, which shows a first side 312b of the housing 312, and FIG. 10, which shows a second side 312c of the housing 312. The sensor shown in FIGS. 7-10 may be configured for a relatively large pressure drop of, for example, 1000 to 1200 Pa or so between the fluid inlet port 16 and the fluid outlet port 18.

Figure 9:
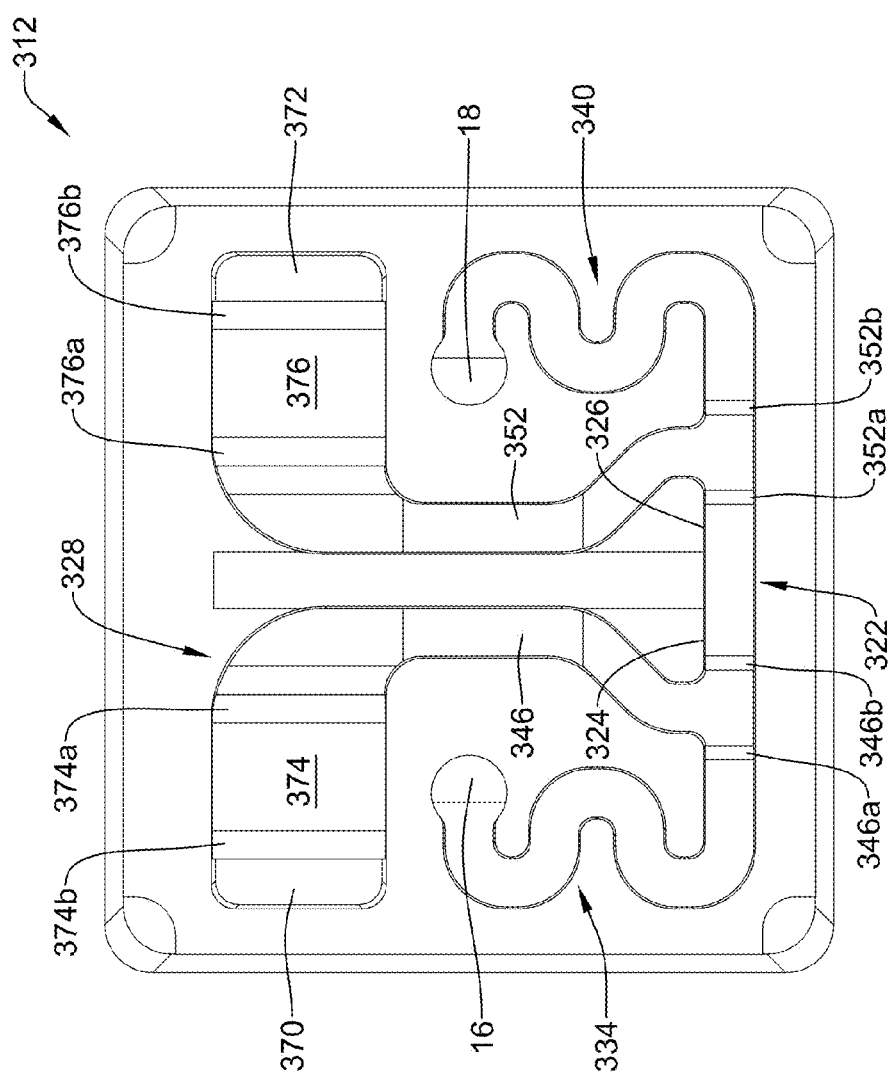
FIG. 9 is a plan view of a first side of a housing used in the illustrative flow sensor of FIG. 7.

As can be seen in FIG. 9, the illustrative housing 312 defines a main channel 322 having a main channel input 324 and a main channel output 326. An inlet flow channel 334 is fluidly connected to the inlet fluid port 16 and to the main channel input 324. An outlet flow channel 340 is fluidly connected to the main channel output 226 and to the outlet port 18. The housing 312 defines a bypass feeder inlet channel 346 that is fluidly connected to the main channel input 324 and extends to the bypass channel 328. A bypass feeder outlet channel 352 is fluidly connected to the bypass channel 328 and to the main channel output 326. In some cases, the bypass feeder inlet channel 346 is deeper than the main channel 322 and the inlet flow channel 334, and may include height step downs 346a and 346b. In some instances, the bypass feeder outlet channel 352 is deeper than the main channel 322 and the outlet flow channel 340, and may include height step downs 352a and 352b.

Figure 10:
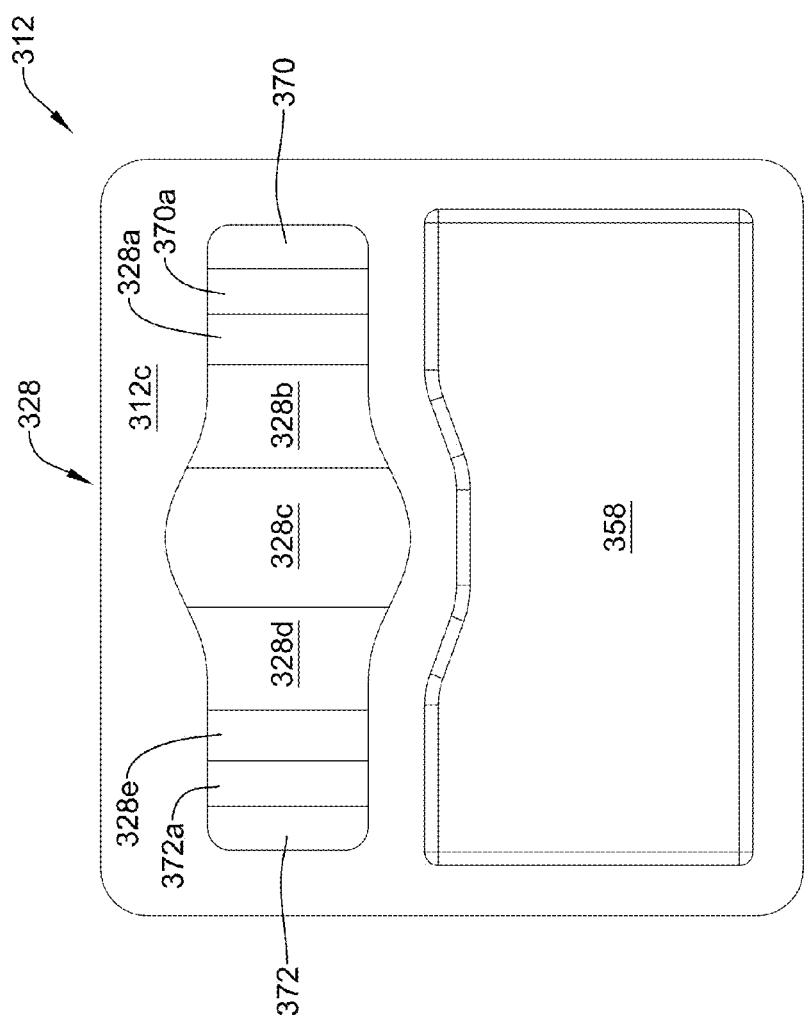
FIG. 10 is a plan view of a second side of the housing of FIG. 9.

In this illustrative design, parts of the bypass channel 328 are disposed on the first side 312b (FIG. 9) and parts of the bypass channel 328 are disposed on the second side 312c (FIG. 10). As can be seen in FIG. 9, the bypass channel 328 includes a first raised portion 374 and a second raised portion 376. The bypass channel 328 includes step up curves 374a and 374b on either side of the first raised portion 374, as well as step up curves 376a and 376b on either side of raised portion 376. Fluid entering the bypass feeder inlet channel 346 will pass over the first raised portion 374 and pass through a first aperture 370 to reach the second side of the bypass channel 328 (see FIG. 10). Fluid passing through the second side of the bypass channel 328 will pass through a second aperture 372 to return to the first side of the bypass channel 328 before flowing over second raised portion 376 and entering the bypass feeder outlet channel 352.

As can be seen in FIG. 10, fluid enters the second side of the bypass channel 328 through the first aperture 370. The illustrative bypass channel 328 includes a curved step up portion 370a adjacent the first aperture 370. The bypass channel 328 includes, adjacent the curved step up portion 370a, a first flat portion 328a, a stepped up portion 328b, a second flat portion 328c having a reduced channel height relative to the first flat portion 328a, a stepped down portion 328d and a second flat portion 328e that is at the same height as the first flat portion 328a. A curved step down portion 372a is adjacent the second aperture 372 by which fluid returns to the first side of the bypass channel 328. As can be appreciated, the illustrated embodiment is symmetric such that it doesn't matter which port is used as the fluid inlet port 16 and which port is used as the fluid outlet port 18. In some cases, a center portion of the bypass channel 28 may have a width that is further enlarged to accommodate the sense die 21 (FIG. 2).

In some instances, at least 50 percent of fluid entering the fluid inlet port 16 will pass through the main channel 322. In some cases, at least 60 percent of fluid entering the fluid inlet port 16 will pass through the main channel 422. In some instances, at least 70 percent of fluid entering the fluid inlet port 16 will pass through the main channel 422. In some cases, at least 80 percent of fluid entering the fluid inlet port 16 will pass through the main channel 422.

In some cases, at least 20 percent of a pressure drop between the fluid inlet port 16 and the fluid outlet port 18 occurs across the inlet flow channel 334 and the outlet flow channel 340 collectively. In some instances, at least 30 percent of a pressure drop between the fluid inlet port 16 and the fluid outlet port 18 occurs across the inlet flow channel 334 and the outlet flow channel 340 collectively. In some cases, at least 40 percent of a pressure drop between the fluid inlet port 16 and the fluid outlet port 18 occurs across the inlet flow channel 334 and the outlet flow channel 340 collectively. In some instances, at least 50 percent of a pressure drop between the fluid inlet port 16 and the fluid outlet port 18 occurs across the inlet flow channel 334 and the outlet flow channel 340 collectively. In some cases, at least 60 percent of a pressure drop between the fluid inlet port 16 and the fluid outlet port 18 occurs across the inlet flow channel 334 and the outlet flow channel 340 collectively. In some instances, at least 70 percent of a pressure drop between the fluid inlet port 16 and the fluid outlet port 18 occurs across the inlet flow channel 334 and the outlet flow channel 340 collectively. In some cases, at least 80 percent of a pressure drop between the fluid inlet port 16 and the fluid outlet port 18 occurs across the inlet flow channel 334 and the outlet flow channel 340 collectively.

Figure 11:
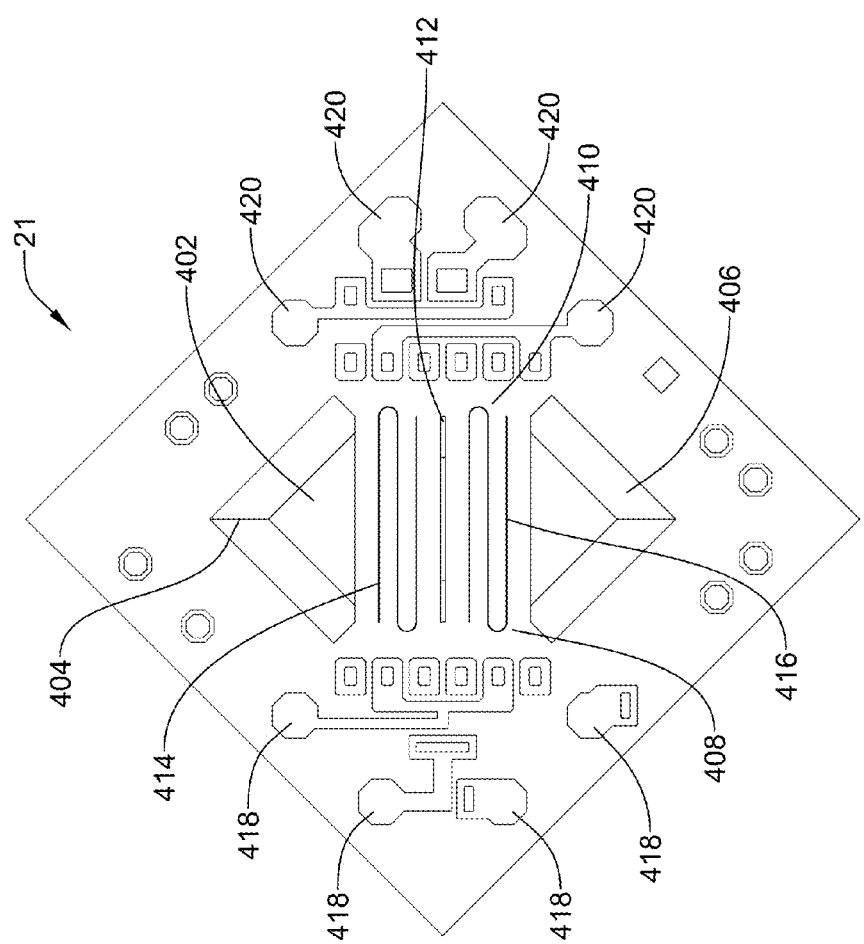
FIG. 11 is a plan view of a sense die usable in the sensors of FIGS. 1 and 7.

The sensors illustrated herein include a sense die 21, as noted in FIGS. 2 and 8. In some cases, the sense die 21 is a flow sensor die. FIG. 11 shows an illustrative sense die 21. In some cases, the sense die 21 may comprise a silicon substrate, although this is not required. In some cases, as shown, the sense die 21 may include a recess 402 that extends from a first recess end 404 to a second recess end 406, forming a bridge 408 that overlies the recess 402. The recess 402 may be formed using any suitable technique, including but not limited to machining, laser cutting or etching. It will be appreciated that at least a portion of the fluid passing through the bypass channel 28, 128, 228, 328 will pass under the bridge 408. The fluid may flow over both sides of the bridge 408 in some cases.

A sense element generally shown at 410 may be disposed on the bridge 408. In this configuration, the bridge 408 and sense element 410 may be thermally coupled to the fluid. Also, the bridge 408 and sense element 410 may be relatively thermally isolated from the remainder of the sense die 21. This configuration may be particularly suitable for a thermal anemometer type flow sensor. Depending on the intended use, the sense element 410 may take a variety of forms, and any variety of structures may be formed on or otherwise disposed on the bridge 408. In some instances, such as for a flow sensor, the sense element may include a heater 412, a first temperature sensor 414 that is upstream (relative to fluid flow direction) of the heater 412 and a second temperature sensor downstream of the heater 416. In some instances, the first temperature sensor and/or the second temperature sensor may be resistors, although this is not required. It will be appreciated that reference to upstream and downstream are relative.

In some cases, the first and second temperature sensors 414, 416 may be formed via thin film deposition or sputtering. In some cases, the first and second temperature sensors 414, 416 may be silicide (Pt, Au, Pd, Mo, Ti, W, Hf, Zr, Cr, or combinations thereof) resistors, but this is not required. The first and second temperature sensors 414, 416 may be formed of materials such as silicon, Permalloy, platinum and/or nichrome. In some cases, the first and second temperature sensors 414, 416 may be provided along a meandering path to extend the effective length for a given space.

The sense die 21 may include a first number of bond pads 418 and a second number of bond pads 420. In some cases, the bond pads 418 and 420 may be formed of materials such as silicon, gold, TiW, aluminum, aluminum-copper, copper and/or silver. In the example shown, the first number of bond pads 418 and the second number of bond pads 420 may be electrically coupled to one or more of the structures formed on, in or under the bridge 408, such as the heater 412 and the first and second temperature sensors 414, 415. Some of the wiring traces are excluded from the drawing in order to not obscure the drawing. The first number of bond pads 418 and the second number of bond pads 420 may be used to electrically couple the sense die 21 to other components on the circuit board 14. In some instances, the first number of bond pads 418 and the second number of bond pads 420 of the sense die 21 may be wire bonded to corresponding bond pads on the circuit board 14.

Figure 12:
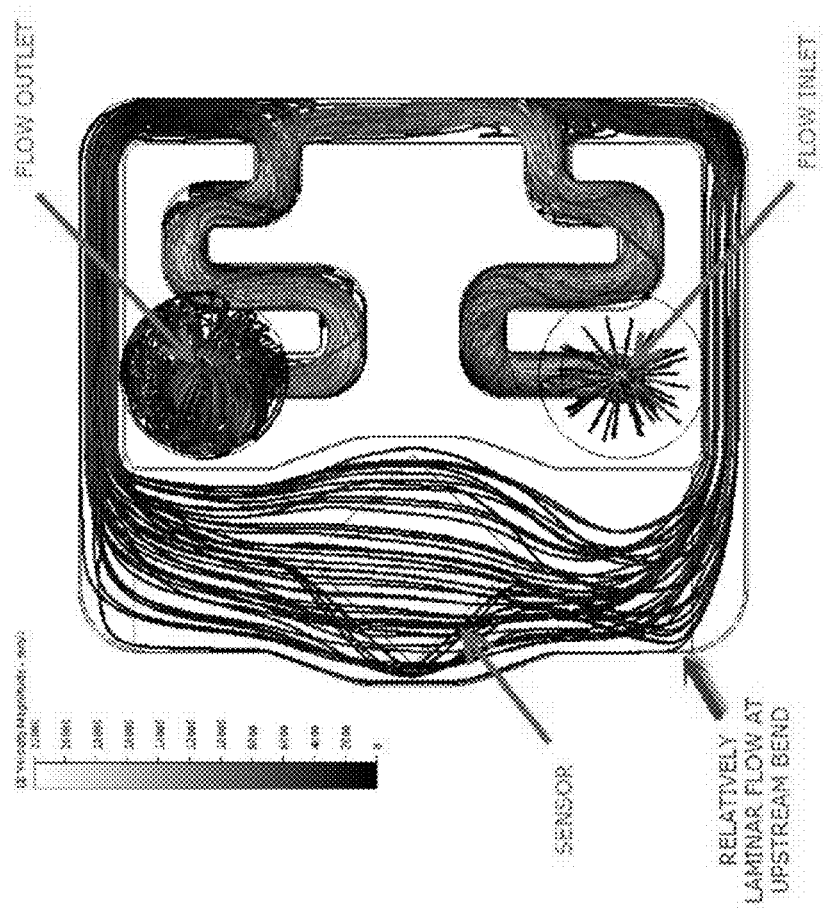
FIG. 12 is a graphical representation of simulation data of a flow sensor similar to that shown in FIG. 1 including a main channel.
Figure 13:
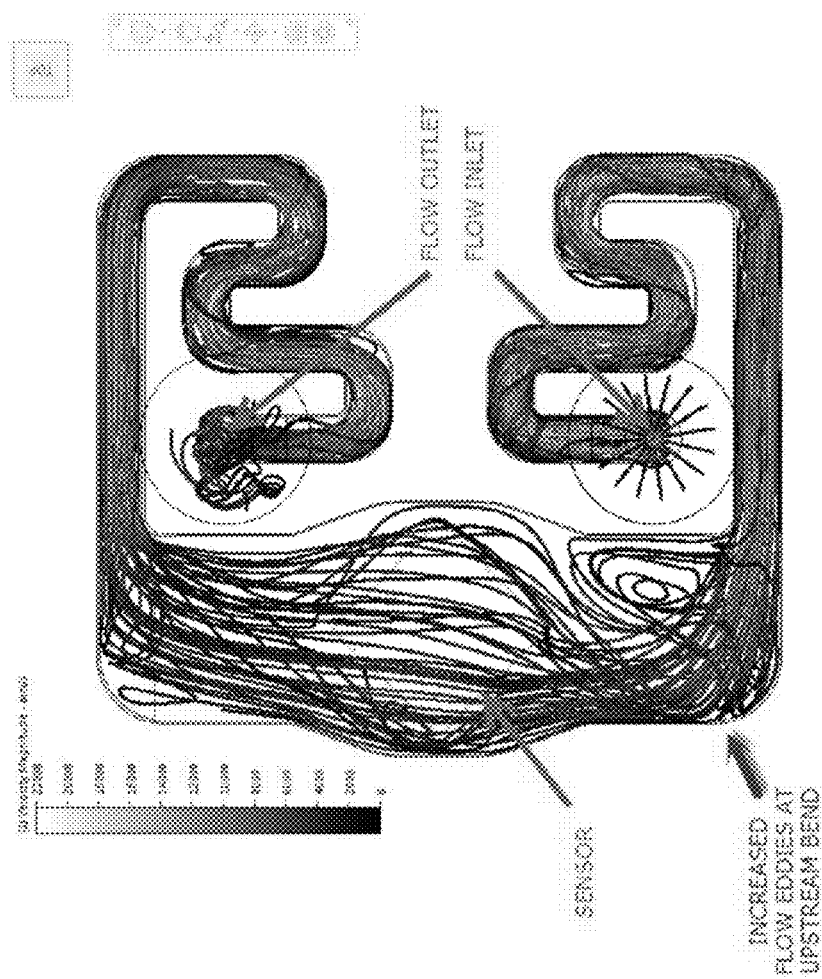
FIG. 13 is a graphical representation of simulation data of a flow sensor similar to that shown in FIG. 1 without a main channel.

FIG. 12 and FIG. 13 are graphical representations of simulation data of a flow sensor similar to that shown in FIG. 1 with a main channel (FIG. 12) and one without a main channel (FIG. 13). These simulation results compare a design that includes a main channel with a design in which everything else is the same but the main channel has been removed. In the simulation, a pressure drop of 1200 Pa was applied between the fluid inlet port 16 and the fluid outlet port 18. A simulation model was set up with approximately 5 million elements and the solver was set to laminar. Any of a variety of commercially available Computational Fluid Dynamics (CFD) simulation software packages may be used for this type of analysis. Some examples are Ansys Fluent, Autodesk Simulation CFD and COMSOL Multiphysics FIG. 12 shows a fluid velocity profile in which lighter grays indicate higher fluid velocities and darker grays to black indicate lower fluid velocities. It can be seen that fluid entering through the fluid inlet is moving at a relatively high velocity, which continues for the fluid flowing through the main channel. Fluid entering the bypass feeder input channel can be seen to be moving at a lower velocity. The lines also indicate relatively laminar flow in the various channels. Laminar flow is desirable in the bypass channel for reducing signal noise at the sensor. In FIG. 13, which shows a design where the main channel of FIG. 12 has been removed, the fluid velocity into the bypass channel is much higher than that shown in FIG. 12. Also, there are increased flow eddies at the upstream bend entering the bypass channel and less uniform flow across the sensor. The flow through the bypass channel and across the sensor can be seen to be faster and more turbulent in the design without the main channel (FIG. 13) than the design with the main channel (FIG. 12). As such, the design without the main channel (FIG. 13) results a significant increased signal noise at the sense die, and thus a reduced signal-to-noise ratio (SN ratio) at the output of the sensor.

The disclosure should not be considered limited to the particular examples described above. Various modifications, equivalent processes, as well as numerous structures to which the disclosure can be applicable will be readily apparent to those of skill in the art upon review of the instant specification.

What is claimed is:
1. A flow sensor assembly comprising:
a housing defining:
an inlet port;
an outlet port;
a main channel having a main channel input and a main channel output;

a bypass channel having a bypass channel input and a bypass channel output;

an inlet flow channel fluidly connecting the inlet port of the flow sensor assembly to the main channel input;

an outlet flow channel fluidly connecting the main channel output to the outlet port of the flow sensor assembly;

a bypass feeder input channel fluidly connecting the main channel input to the bypass channel input;

a bypass feeder output channel fluidly connecting h bypass channel output to the main channel output;

wherein the inlet flow channel, the outlet flow channel, and the main channel are configured so that a combined pneumatic resistance of the inlet flow channel and the outlet flow channel is at least two times greater than a pneumatic resistance of the main channel;

a sensor exposed to a fluid in the bypass channel and configured to sense a measure related to a flow rate of the fluid flowing through the bypass channel.

2. The flow sensor assembly of claim 1, wherein the housing is configured such that at least 70 percent of a fluid flow flowing from the inlet port to the outlet port of the flow sensor assembly flows through the main channel rather than the bypass channel.

3. The flow sensor assembly of claim 1, wherein the bypass feeder input channel has a length that is at least three times hydraulic diameter up to about en times its hydraulic diameter.

4. The flow sensor assembly of claim 1, wherein a majority of the bypass feeder input channel extends along a straight path.

5. The flow sensor assembly of claim 1, wherein the inlet flow channel follows a circuitous path with two or more distinct bends.

6. The flow sensor assembly of claim 1, wherein the main channel extends in a first direction from the main channel input along a straight path to the main channel output, and wherein the bypass feeder input channel extends away from the main channel inlet in a second direction opposite to the first direction.

7. The flow sensor assembly of claim 6, wherein the bypass channel extends from the bypass channel input along a straight path to the bypass channel output.

8. The flow sensor assembly of claim 1, wherein the main channel has a minimum channel width and the bypass channel has a minimum channel width, wherein the minimum channel width of the bypass channel is greater than the minimum channel width of the main channel.

9. The flow sensor assembly of claim 8, wherein the minimum channel width of the bypass channel is at least two times greater than the minimum channel width of the main channel.

10. The flow sensor assembly of claim 1, wherein the bypass feeder input channel has a minimum channel width, and wherein the minimum channel width of the bypass channel is at least three times greater than the minimum channel width of the bypass feeder input channel, and wherein the effective hydraulic diameter of the bypass channel is within 30 percent of the effective hydraulic diameter of the bypass feeder input channel.

11. The flow sensor assembly of claim 1, wherein inlet flow channel has a minimum channel width and the main channel has a minimum channel width, and wherein the minimum channel width of the inlet flow channel is within 20 percent of the minimal channel width of the main channel.

12. The flow sensor assembly of claim 10, wherein the bypass feeder input channel has a minimum channel width, and wherein the minimum channel width of the bypass feeder input channel is within 20 percent of the minimal channel width of the main channel.

13. The flow sensor assembly of claim 1, wherein the main channel and the bypass channel are molded into a first side of the housing.

14. The flow sensor assembly of claim 1, wherein the main channel is molded into a first side of the housing, and the bypass channel is molded into a second opposite side of the housing.

15. A flow sensor comprising:

a housing having an inlet port, an outlet port, and a sensing channel in fluid communication with the inlet port and the outlet port;

the housing having a mounting footprint of less than 200 mm$^2$; and the housing configured to accept an input differential pressure of 1000 Pa across the inlet port and the outlet port while providing a flow in the sensing channel of less than 200 Standard Cubic Centimeters per Minute (SCCM) and laminarized at a Reynolds number of less than 1.50.

16. The flow sensor of claim 15, further comprising a flow sensor configured to sense a measure related to a flow rate of a fluid flowing in the sensing channel.

17. The flow sensor of claim 15, wherein the housing is configured to accept an input differential pressure of 1200 Pa across the inlet port and the outlet port while providing a flow in the sensing channel of less than 150 Standard Cubic Centimeters per Minute (SCCM) and laminarized at a Reynolds number of less than 150.

18. The flow sensor of claim 15, wherein the housing comprises a main channel, with the sensing channel connected in parallel with the main channel, wherein the sensing channel presents a pneumatic resistance that is at least two times greater than the pneumatic resistance of the main channel, and wherein the main channel is connected to the inlet port of the housing via an inlet flow channel and to the outlet port of the housing via an outlet flow channel, wherein the collective pneumatic resistance of the inlet flow channel and the outlet flow channel is at least two times greater than the pneumatic resistance of the main channel.

19. A flow sensor comprising:

a housing having an inlet port and an outlet port;

the housing defining a flow path extending between the inlet port and the outlet port, wherein the flow path comprises:

an inlet flow channel extending between the inlet port and an upstream tap;

an outlet flow channel extending between a downstream tap and the outlet port;

a main channel extending between the upstream tap and the downstream tap;

wherein the inlet flow channel has a minimum cross-sectional area that is within 30 percent of the minimum cross-sectional area of the main channel and the inlet flow channel has a length that is greater than the length of the main channel;

the housing further defining a bypass channel situated in parallel with the main channel of the flow path and extending between the upstream tap and the downstream tap of the flow path, wherein the inlet flow channel, the outlet flow channel, and the main channel are configured so that a combined pneumatic resistance of the inlet flow channel and the outlet flow channel is at least two times greater than a pneumatic resistance of the main channel; and a sensor exposed to a fluid in the bypass channel and configured to sense a measure related to a flow rate of the fluid flowing through the bypass channel.

20. The flow sensor of claim 19, wherein the housing is configured so that the flow rate through the bypass channel is less than 50 percent of the flow rate through the flow path.

* * * * *